(12) United States Patent
Nguyen et al.

(10) Patent No.: US 9,611,825 B2
(45) Date of Patent: Apr. 4, 2017

(54) METHOD AND DEVICE FOR MONITORING/CONTROLLING THE STARTING OF A HEAT ENGINE OF A HYBRID VEHICLE

(71) Applicant: RENAULT s.a.s., Boulogne-Billancourt (FR)

(72) Inventors: Hoang-Giang Nguyen, Ris Orangis (FR); Ahmed Ketfi-Cherif, Elancourt (FR); Christophe Dang, Villejuif (FR); Jean Van-Frank, Rueil Malmaison (FR); Emmanuel Laurain, Villeneuve le Roi (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 61 days.

(21) Appl. No.: 14/433,463

(22) PCT Filed: Oct. 1, 2013

(86) PCT No.: PCT/FR2013/052332
§ 371 (c)(1),
(2) Date: Jun. 11, 2015

(87) PCT Pub. No.: WO2014/057189
PCT Pub. Date: Apr. 17, 2014

(65) Prior Publication Data
US 2015/0308398 A1    Oct. 29, 2015

(30) Foreign Application Priority Data

Oct. 9, 2012 (FR) .................................... 12 59611

(51) Int. Cl.
G01R 31/00       (2006.01)
F02N 11/08       (2006.01)
(Continued)

(52) U.S. Cl.
CPC .......... *F02N 11/0862* (2013.01); *B60L 3/106* (2013.01); *B60L 3/108* (2013.01);
(Continued)

(58) Field of Classification Search
USPC ......... 340/438, 657; 324/426; 320/104, 107, 320/134; 701/31.4, 32.8, 423; 702/63,
(Continued)

(56) References Cited

U.S. PATENT DOCUMENTS 6,988,053 B2 * 1/2006 Namaky .............. G01R 31/007
320/104
2004/0078155 A1 * 4/2004 Thibedeau ............ H02J 7/1461
702/63
(Continued)

FOREIGN PATENT DOCUMENTS

DE    10 2007 047619    4/2009
EP         2 292 459    3/2011
WO       2005 085630    9/2005

OTHER PUBLICATIONS

International Search Report Issued Mar. 4, 2014 in PCT/FR13/052332 Filed Oct. 1, 2013.
(Continued)

*Primary Examiner* — Thomas Tarcza
*Assistant Examiner* — Richard Goldman
(74) *Attorney, Agent, or Firm* — Oblon, McClelland, Maier & Neustadt, L.L.P.

(57) ABSTRACT

A method for monitoring/controlling starting of a heat engine of a hybrid vehicle including at least one electrical engine, including: launching a simulated sequence for starting the heat engine by using a start battery; measuring and recording progress over time of at least one parameter of the start battery, including a given current strength and voltage at terminals of the start battery; and detecting whether or not
(Continued)

Figure 1:
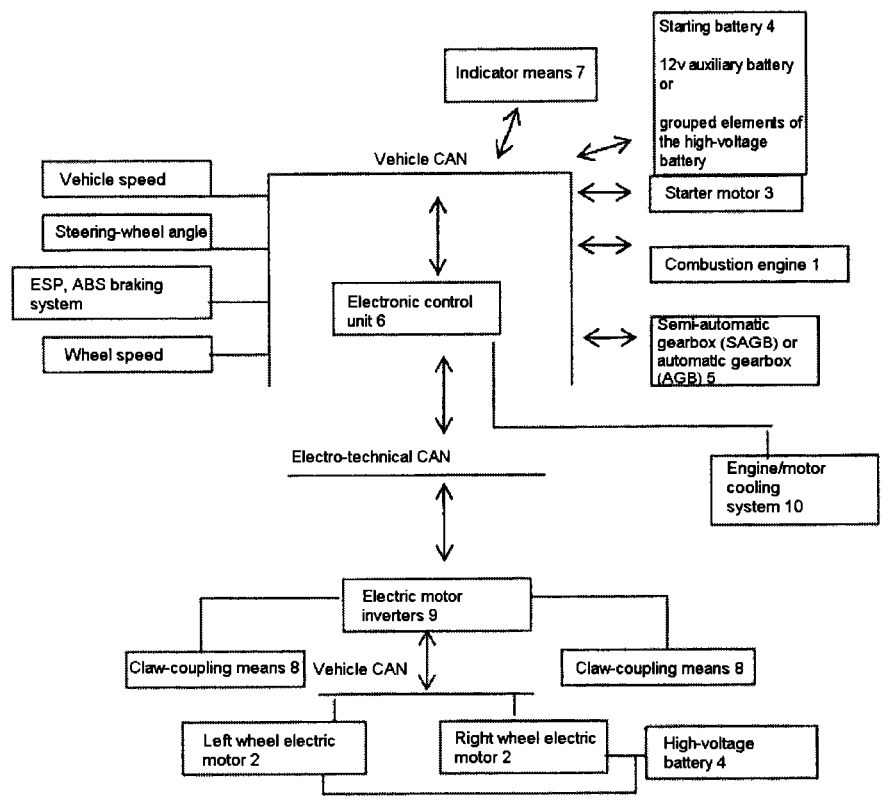

the progress over time of the at least one parameter reaches a predetermined value defining a state of the start battery, with or without a required capacity, for starting the heat engine during a predetermined time interval.

10 Claims, 4 Drawing Sheets

(51) Int. Cl.
| | |
|---|---|
| B60L 11/18 | (2006.01) |
| B60W 50/14 | (2012.01) |
| B60W 10/06 | (2006.01) |
| B60W 10/08 | (2006.01) |
| B60W 10/26 | (2006.01) |
| B60W 20/40 | (2016.01) |
| B60W 20/50 | (2016.01) |
| B60L 3/10 | (2006.01) |
| B60L 11/14 | (2006.01) |
| B60L 15/20 | (2006.01) |
| B60K 6/26 | (2007.10) |
| F02D 41/22 | (2006.01) |
| B60W 50/02 | (2012.01) |

(52) U.S. Cl.
CPC .......... *B60L 11/14* (2013.01); *B60L 11/1851* (2013.01); *B60L 11/1861* (2013.01); *B60L 11/1868* (2013.01); *B60L 15/2054* (2013.01); *B60W 10/06* (2013.01); *B60W 10/08* (2013.01); *B60W 10/26* (2013.01); *B60W 20/40* (2013.01); *B60W 20/50* (2013.01); *B60W 50/14* (2013.01); *F02N 11/08* (2013.01); *F02N 11/0825* (2013.01); *B60K 2006/268* (2013.01); *B60L 2210/40* (2013.01); *B60L 2240/12* (2013.01); *B60L 2240/24* (2013.01); *B60L 2240/421* (2013.01); *B60L 2240/423* (2013.01); *B60L 2240/461* (2013.01); *B60L 2240/486* (2013.01); *B60L 2240/545* (2013.01); *B60L 2240/547* (2013.01); *B60L 2240/549* (2013.01); *B60L 2240/80* (2013.01); *B60L 2250/10* (2013.01); *B60W 2050/021* (2013.01); *B60W 2510/242* (2013.01); *B60W 2510/244* (2013.01); *B60W 2710/06* (2013.01); *B60W 2710/08* (2013.01); *F02D 2041/228* (2013.01); *F02N 2200/061* (2013.01); *F02N 2200/062* (2013.01); *F02N 2200/063* (2013.01); *F02N 2250/02* (2013.01); *Y02T 10/48* (2013.01); *Y02T 10/6278* (2013.01); *Y02T 10/6286* (2013.01); *Y02T 10/645* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7241* (2013.01); *Y02T 10/7275* (2013.01); *Y10S 903/93* (2013.01)

(58) Field of Classification Search
USPC ........................................................ 702/183
See application file for complete search history.

(56) References Cited

U.S. PATENT DOCUMENTS

| | | | |
|---|---|---|---|
| 2004/0099234 A1 | 5/2004 | Tamai et al. | |
| 2004/0130296 A1* | 7/2004 | Gross | G01R 31/3648 320/133 |
| 2007/0103284 A1* | 5/2007 | Chew | G01R 31/3693 340/438 |
| 2007/0276556 A1 | 11/2007 | Noel et al. | |
| 2008/0224710 A1* | 9/2008 | Henningson | G01R 19/16542 324/433 |
| 2009/0286652 A1 | 11/2009 | Noel et al. | |
| 2010/0106361 A1* | 4/2010 | Thibedeau | H02J 7/1461 701/31.4 |
| 2011/0266865 A1 | 11/2011 | Okabe et al. | |
| 2012/0029852 A1* | 2/2012 | Goff | G01R 31/3679 702/63 |
| 2012/0041697 A1* | 2/2012 | Stukenberg | G01R 31/3637 702/63 |
| 2013/0261914 A1* | 10/2013 | Ingram | B60W 20/12 701/70 |
| 2015/0028808 A1* | 1/2015 | Bernardi | B60L 11/1809 320/109 |
| 2015/0197153 A1* | 7/2015 | Luedtke | B60L 3/0023 324/503 |
| 2016/0039291 A1* | 2/2016 | Reese | B60L 3/12 701/29.3 |

OTHER PUBLICATIONS

French Search Report Issued Aug. 2, 2013 in French Application No. 1259611 Filed Oct. 9, 2012.

* cited by examiner

METHOD AND DEVICE FOR MONITORING/CONTROLLING THE STARTING OF A HEAT ENGINE OF A HYBRID VEHICLE

The present invention relates to the field of methods and devices for starting a combustion engine used in a hybrid vehicle.

A hybrid vehicle comprises a combustion engine and at least one electric motor positioned on the front axle assembly or on the rear axle assembly of the wheels. For example, by way of illustration, one electric motor may be positioned on each rear wheel of the hybrid vehicle.

The electric motor is generally intended to drive the hybrid vehicle in urban areas and the combustion engine is generally intended to drive the hybrid vehicle outside of urban areas.

The hybrid vehicle can be propelled using various modes of operation, also known in the literature as propulsion modes.

A first mode of operation in which the electric motor or motors is/are used to provide all of the power necessary to propel the vehicle, a second mode of operation in which the combustion engine alone is used to provide all of the power necessary to propel the vehicle, and a third mode of operation in which the electric motor or motors and the combustion engine are used to provide all of the power needed to propel the vehicle.

The hybrid vehicle has an electrical architecture intended to allow for the operation of these various modes of operation and to operate the combustion engine and the electric motor or motors.

Electronic control units ECUs notably control the operation of a combustion engine, of one or more electric motor(s) and of a semi-automatic gearbox (SAGB) or automatic gearbox (AGB) via a CAN multiplexing bus according to parameters of the vehicle.

The electronic control units ECUs allow the transmission of driving torques to the wheels in propulsion mode and the transmission of braking torques from the wheels to the electric motor or motors via claw coupling means in order to recharge the batteries of the electric motor.

The vehicle parameters taken into consideration by the electronic control units ECUs are measured by sensors and may relate to the movement of the vehicle.

The vehicle parameters are, for example, the vehicle speed, the steering wheel angle, the speed of the wheels, the ESP (electronic stability program) or ABS (anti-lock braking system).

One problem encountered at the present time with hybrid vehicles is that of starting the combustion engine.

The starting of the combustion engine is related to the state of a starting battery, such as the 12 V (Volts) auxiliary battery which powers the starter motor or the alternator-starter.

When the starting battery is in a poor condition or short circuited, it no longer delivers the current necessary to start the starter or the alternator-starter of the combustion engine.

When that happens, the switch between the first mode of operation and the second mode of operation of the hybrid vehicle cannot be made.

Furthermore, the drop in voltage of the on-board network below 4.5 V that this malfunctioning state of the battery may engender causes the electronic control units ECUs to be reset.

This resetting of the electronic control units ECUs may lead to a loss of the electric power steering operated by these electronic control units ECUs and therefore a loss of control of the movement of the hybrid vehicle by the driver.

In order to address this problem, certain hybrid vehicles comprise a main starting battery and a replacement starting battery, the main starting battery being replaced in the event of malfunctioning, this device making it possible to continue to maintain control over the movement of the hybrid vehicle.

However, this solution uses two starting batteries, which is expensive and requires that additional space be provided on the vehicle for the replacement battery.

In that context, it is an object of the present invention to propose a method and a device for a hybrid vehicle that is exempt of at least one of the limitations mentioned hereinabove.

The method for commanding and controlling the starting of a combustion engine of a hybrid vehicle comprising at least one electric motor, is notable in that it exhibits steps consisting in:

beginning a pseudo (simulated) starting sequence of starting the combustion engine using a starting battery, measuring and recording an evolution with respect to time of at least one parameter of the starting battery comprising a given current strength and a given voltage across the terminals of said starting battery, detecting whether or not the evolution with respect to time of the said parameter or parameters reaches a predetermined value defining a state of capacity of the starting battery of having or not having the capacity to start the combustion engine, over a given interval of time, if it is detected that the state of the starting battery is that it has the capacity, starting the combustion engine, using the starting battery, if it is not detected that the state of the starting battery is that it has the capacity, allowing the electric motor to be used for propelling the hybrid vehicle and warning the driver that the detected state of the starting battery is that it does not have the capacity.

The beginning of the pseudo starting sequence is performed while the electric motor of the hybrid vehicle is in operation.

The beginning of the pseudo starting sequence is performed while the electric motor of the hybrid vehicle is switched off.

The step of detecting the state of capacity of the starting battery is performed for a duration of less than 300 ms (milliseconds).

The state of capacity of the starting battery is defined by an increase in current strength of several hundred amps and a drop in voltage below one to several volts for a duration of between 100 ms and 200 ms.

The state of capacity of the starting battery is defined by the current strength reaching at least 800 A, a drop in voltage of under 3.8 V from 12.8 V for a duration of less than 200 milliseconds.

The invention also relates to a device for the command and control of the starting of a combustion engine of a hybrid vehicle comprising a combustion engine, at least one electric motor, a means of starting the combustion engine such as a starter motor, a starting battery, all operated by a main electronic control unit, the main electronic control unit making it possible to:

begin a pseudo starting sequence of starting the combustion engine by means of the starting means powered by the starting battery, measure and record an evolution with respect to time of at least one parameter of the starting battery comprising a given current strength and a given voltage across the terminals of said starting battery, detect whether or not the evolution with respect to time of the said parameter or parameters reaches a predetermined value defining a state of capacity of the starting battery of having or not having the capacity to start the combustion engine, over a given interval of time, if it is detected that the state of the starting battery is that it has the capacity, starting the combustion engine, using the starting battery, if it is not detected that the state of the starting battery is that it has the capacity, allowing the electric motor to be used for propelling the hybrid vehicle and warning the driver that the detected state of the starting battery is that it does not have the capacity.

Advantageously, the command and control device comprises a semi-automatic gearbox (SAGE) or an automatic gearbox (AGB).

The main electronic control unit allows the starting of the combustion engine followed by an engagement of said gearbox if it is not detected that the state of the starting battery is that it has the capacity and if the vehicle is being propelled by the electric motor.

The starting battery is the 12 V auxiliary battery.

The device comprises an indicator means housed in the vehicle, connected to the main electronic control unit and alerting the driver to the mode of operation of the vehicle.

Figure 2:
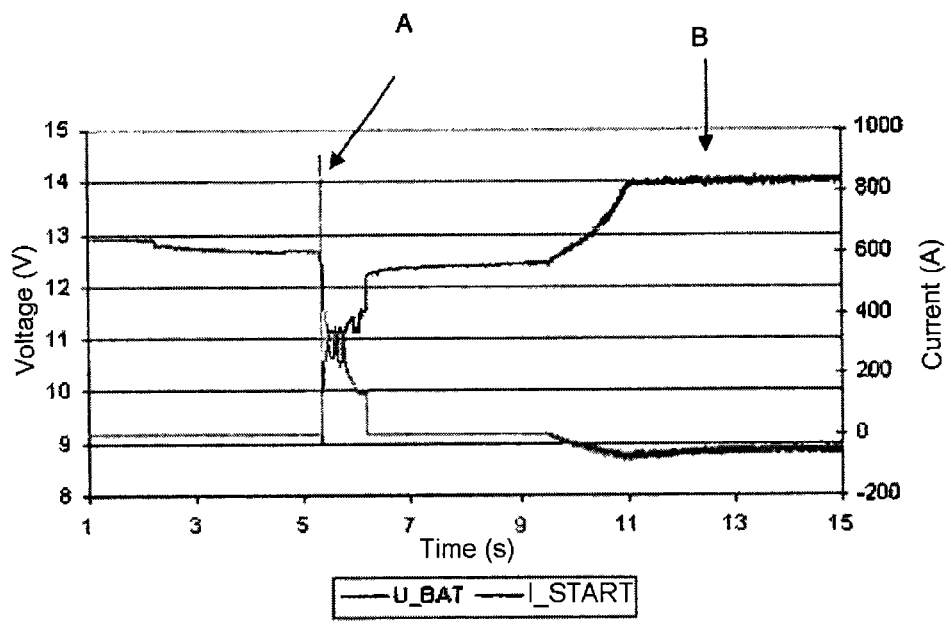
Figure 3:
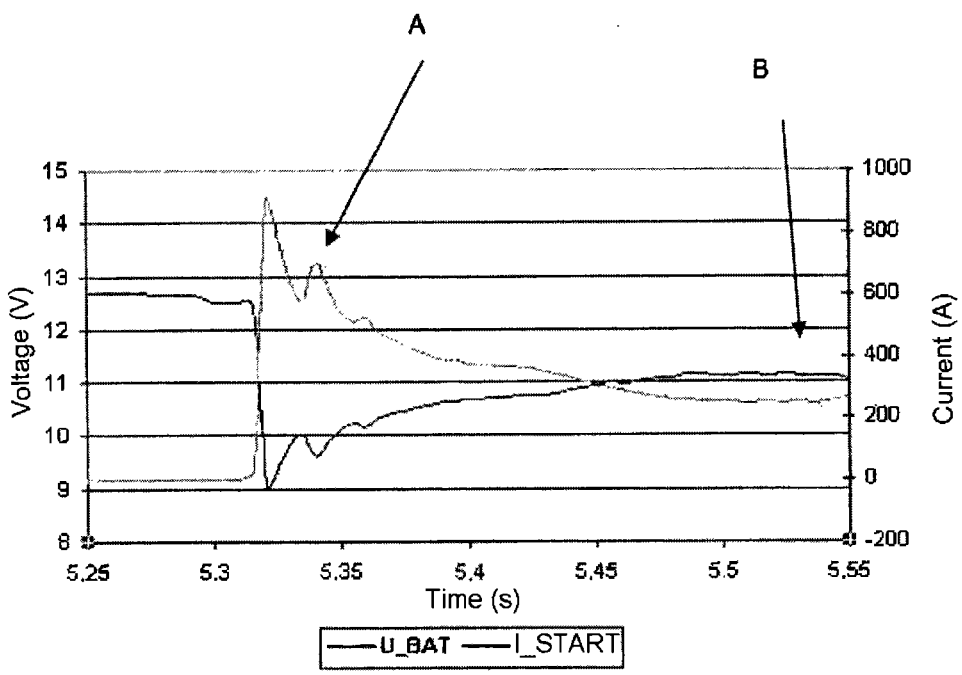
Figure 4:
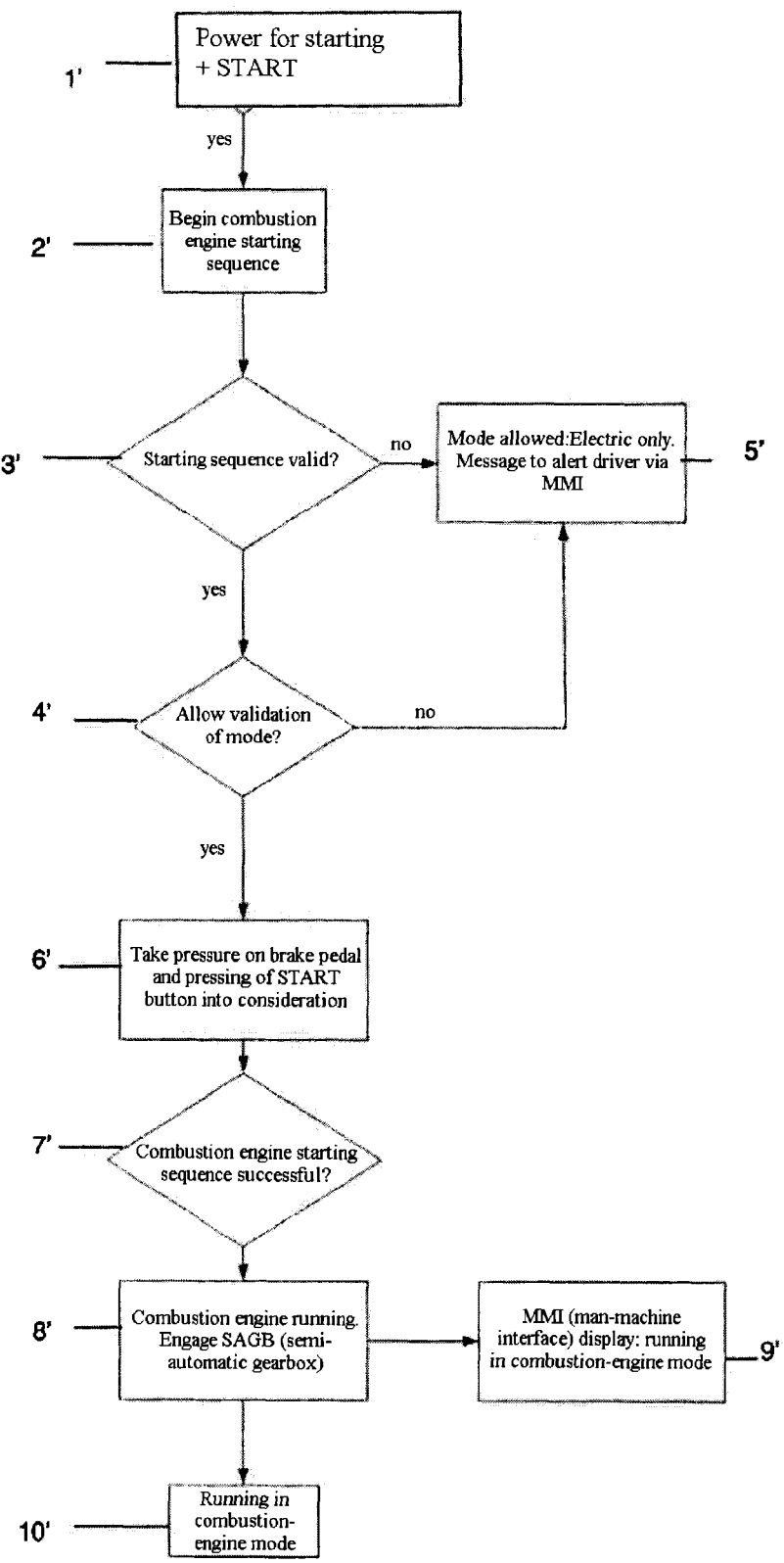
Figure 5:
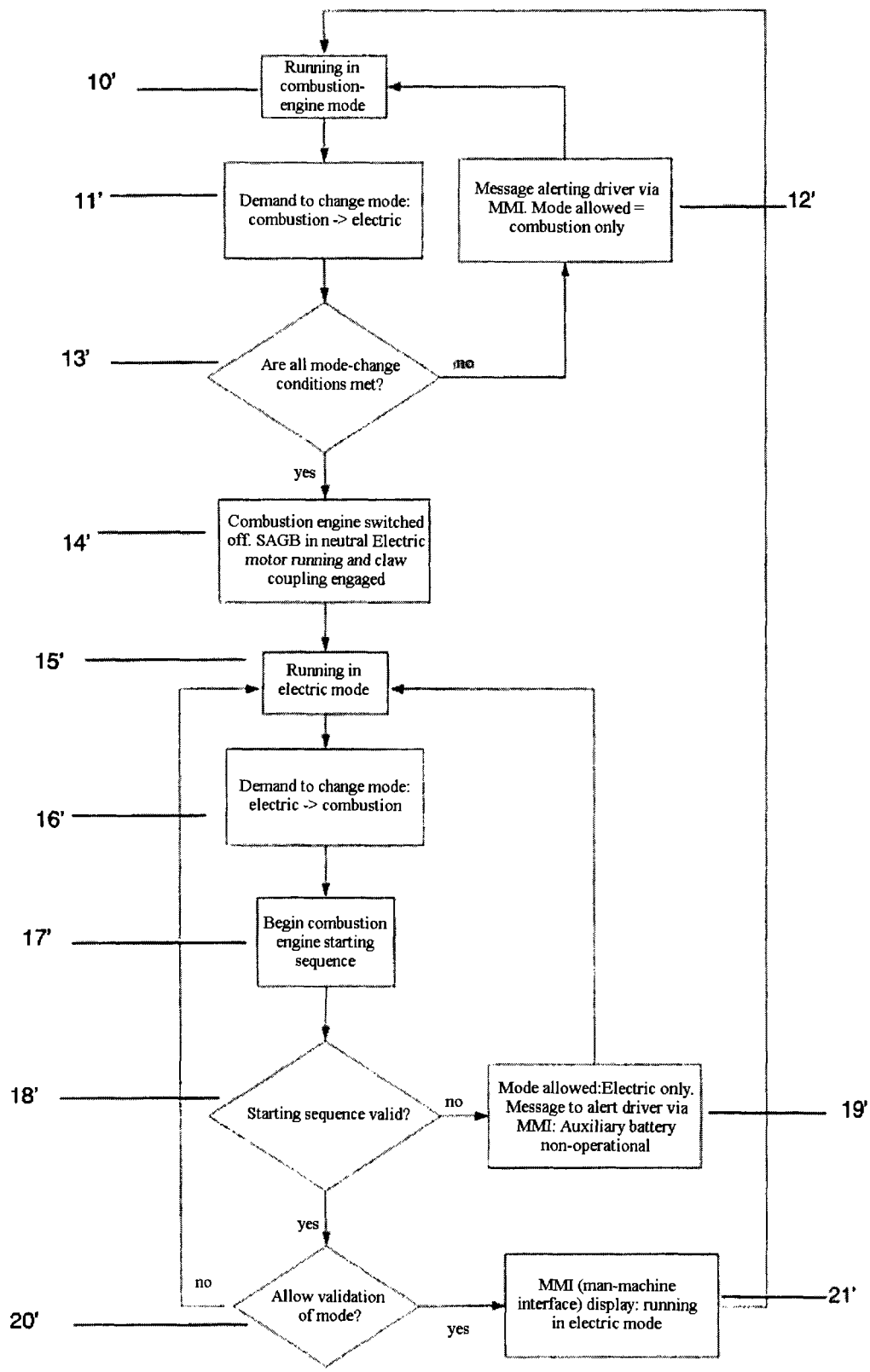

Other features and advantages of the invention will become clearly apparent from the description thereof given hereinafter by way of entirely nonlimiting indication, with reference to the attached drawings in which:

FIG. 1 schematically depicts the electrical architecture of a hybrid vehicle according to the invention;

FIGS. 2 and 3 graphically depict the same evolutions with respect to time of the voltage and of the current when the combustion engine is being started, with two different time scales;

FIGS. 4 and 5 schematically depict the method of starting a combustion engine of a hybrid vehicle according to the invention.

As depicted in FIG. 1, the device allowing the starting of a combustion engine of a hybrid vehicle according to the invention comprises: a combustion engine 1, one or more electric motor(s) 2, a means 3 of starting the combustion engine 1 such as a starter motor or an alternator-starter, a starting battery 4, such as the 12 V auxiliary battery or a group of elements of the high-voltage battery of the electric motors in order to obtain 12 V, which is connected to the starting means 3, and a semi-automatic gearbox (SAGB) 5 or automatic gearbox (AGB) 5.

A main electronic control unit ECU 6 controls the operation of these elements via the CAN multiplexing bus and electronic control units ECUs of the combustion engine 1 and of the electric motor or motors 2.

Claw-coupling means 8 are operated by electric motor inverters 9 controlled by the main electronic control unit 6.

The main electronic control unit 6 also controls a system 10 for cooling the motors.

An indicating means 7, such as a visual indicating means using a screen and a man-machine interface MMI, is housed in the vehicle and connected to the main electronic control unit 6.

It allows the driver to be alerted to the mode of operation being used for propelling the hybrid vehicle.

FIGS. 2 and 3 graphically depict the same evolutions with respect to time of the voltage and of the current during the starting of the combustion engine, with two different time scales, the time scale being larger in FIG. 3 than in FIG. 2.

It may be seen from the curves of FIGS. 2 and 3 that there is demand for current at the terminals of the starting battery 4 when the combustion engine 1 of the hybrid vehicle is started.

This inrush for current is manifested, in FIGS. 2 and 3, by a strong increase in current for a duration t of less than 200 milliseconds, the current jumping, in curve A of FIGS. 2 and 3, from 0 to 800 A, whereas over the same duration t, the voltage drops, in curve B, from 12.8 V to 9 V.

This inrush for current signifies that the combustion engine 1 can be started using the starting means 3 powered by the starting battery 4. In such a case, the starting battery 4 is said to have the capacity.

These ranges of values are given solely by way of illustration and are dependent on the combustion engine, on the starter and on the starting battery used.

Thus, the invention makes it possible, before carrying out the starting of a combustion engine of a hybrid vehicle, to verify that, during a pseudo starting sequence of a duration less than a few hundreds of milliseconds, a current increase of a few hundred amps and a voltage drop by one to several volts is observed.

As illustrated in FIG. 4, the driver switches on to start the hybrid vehicle in a first step 1', which causes the pseudo starting sequence of starting the combustion engine 1 using the starting means 3 powered by the starting battery 2 to be begun in a second step 2'.

If the inrush for current at the terminals of the starting battery 4 is detected by the main electronic control unit 6 in a third step 3', then the starting battery 4 has the capacity and the starting sequence is validated.

The main electronic control unit 6 then allows the mode of operation of the hybrid vehicle using the combustion engine 1 in a fourth step 4'.

If not, in a step 5', if the inrush of current is not detected at the terminals of the starting battery 4, then the starting battery 4 does not have the capacity, the main electronic control unit 6 does not allow the mode of operation of the hybrid vehicle using the combustion engine 1 and the hybrid vehicle is propelled solely by the electric motor or motors 2.

The indicator means 7 sends a warning message to the driver indicating that the combustion engine 1 is not used. The driver is thus alerted to the fact that the starting battery 4 does not have the capacity.

In a sixth step 6', pressure on the brake pedal and the "start" button are taken into consideration.

In a seventh step 7', the starting sequence for starting the combustion engine 1 is validated by the main electronic control unit 6.

In an eighth step 8', the combustion engine 1 is turning over and the semi-automatic gearbox 5 is engaged.

In a ninth step 9', the indicator means 7 indicates to the driver that the mode of operation with the combustion engine 1 is used.

In a tenth step 10', the hybrid vehicle is propelled under the action of the combustion engine 1.

The method according to the invention is also illustrated in FIG. 5 from the time the hybrid vehicle is being propelled by operation of the combustion engine 1 and achieved during the tenth step 10'.

In an eleventh step 11', a demand to change mode is demanded by the driver in order to switch over from the combustion engine 1 to the electric motor or motors 2.

If, in a thirteenth step 13', the mode-change conditions are all met then the main electronic control unit 6 in a fourteenth step 14' commands and checks the stopping of the combustion engine 1 and the positioning of the gearbox in neutral. The electric motor or motors 2 are turning and the claw coupling means are engaged.

If not, if the conditions for changing the mode of operation are not all met, the hybrid vehicle is propelled only by the combustion engine 1 and the indicator means 7 indicates to the driver in a twelfth step 12' that only the combustion engine 1 is allowed to be used for propelling the vehicle.

In a fifteenth step 15', the vehicle is propelled by the electric motor or motors.

In a sixteenth step 16', a demand to change the mode of operation using the electric motor 2 to the mode of operation using the combustion engine 1 is made by the driver.

In a seventeenth step 17', a pseudo starting sequence of starting the combustion engine 1 is begun.

In an eighteenth step 18', the main electronic control unit 6 measures and records the state of the starting battery 4 and detects whether the starting battery 4 has the capacity in order to determine whether the starting sequence is valid.

In a nineteenth step 19', the main electronic control unit 6 sends a message to the indicator means 7 which alerts the driver to the fact that only the mode using the electric motor 2 is allowed because the starting battery does not have the capacity.

In that case, the hybrid vehicle is propelled only by the electric motor or motors and the method loops back to the fifteenth step 15'.

In a twentieth step 20', the starting sequence is validated by the main electronic control unit 6.

In a twenty-first step 21', the main electronic control unit 6 sends a message to the driver via the indicator means 7 which alerts the driver to the fact that the vehicle is being propelled using the combustion engine 1.

The hybrid vehicle is propelled only by the combustion engine 1 and the method according to the invention loops back to the tenth step 10'.

Thus, the present invention describes a method and a device which, by measuring the state of the starting battery, make it possible to warn the driver of any draining or nonoperation of this battery, it being possible for the draining or nonoperation thereof to cause the electronic control units that govern the operation of the combustion engine and of the electric motor or motors that propel the hybrid vehicle to restart, with the risk of the driver losing control of the movement of the hybrid vehicle.

In such a situation, the method according to the invention makes it possible to authorize operation of the electric motor or motors and prevent the combustion engine from being started using the starting battery either when the vehicle is stopped or while the vehicle is being propelled by the electric motor or motors.

The variation in starting battery state is measured over a duration of the order of a few hundred milliseconds. It is therefore imperceptible to the driver, nor does it trouble the driver in his vehicle control.

The starting method can also be used for starting the combustion engine while keeping the electric motor or motors running, according to the third mode of operation of the hybrid vehicle which uses both combustion engine and electric motor.

The invention claimed is:

1. A method for commanding and controlling starting of a combustion engine of a hybrid vehicle including at least one electric motor, the method comprising:

beginning a simulated starting sequence of starting the combustion engine using a starting battery;

measuring and recording an evolution with respect to time of at least one parameter of the starting battery comprising a given current strength and a given voltage across terminals of the starting battery;

detecting whether the evolution with respect to time of the parameter or parameters reaches a predetermined value defining a state of the starting battery having a capacity to start the combustion engine over a predetermined interval of time;

if it is detected that the state of the starting battery has the capacity, starting the combustion engine, using the starting battery; and if it is not detected that the state of the starting battery has the capacity, allowing the electric motor to be used for propelling the hybrid vehicle and warning a driver that the state of the starting battery, which was detected, does not have the capacity.

2. The command and control method as claimed in claim 1, wherein the beginning of the simulated starting sequence is performed while the electric motor of the hybrid vehicle is in operation.

3. The command and control method as claimed in claim 1, wherein the beginning of the simulated starting sequence is performed while the electric motor of the hybrid vehicle is switched off.

4. The command and control method as claimed in claim 1, wherein the detecting the state of capacity of the starting battery is performed for a duration of less than 300 ms (milliseconds).

5. The command and control method as claimed in claim 1, wherein the predetermined value defining the state of the starting battery is defined by an increase in current strength of several hundred amps and a drop in voltage below one to several volts for a duration of between 100 ms (milliseconds) and 200 ms (milliseconds).

6. The command and control method as claimed in claim 1, wherein the predetermined value defining the state of the starting battery is defined by the current strength reaching at least 800 A (Amps), and a drop in voltage of less than 3.8 V (Volts) starting from 12.8 V (Volts) for a duration of less than 200 milliseconds.

7. A device for command and control of starting of a combustion engine of a hybrid vehicle comprising:

a combustion engine;

at least one electric motor;

a starter motor;

a starting battery; and a main electronic control unit, wherein each of the combustion engine, at least one electric motor, the starter motor, and the starting battery are all operated by and connected by electrical connection to the main electronic control unit, wherein the main electronic control unit is configured to:

begin a simulated starting sequence of starting the combustion engine by the starter motor powered by the starting battery;

measure and record an evolution with respect to time of at least one parameter of the starting battery comprising a given current strength and a given voltage across terminals of the starting battery;

detect whether or not the evolution with respect to time of the parameter or parameters reaches a predetermined value defining a state of capacity of the starting battery of having or not having a capacity to start the combustion engine, over a predetermined interval of time;

if it is detected that the state of the starting battery has the capacity, starting the combustion engine, using the starting battery; and if it is not detected that the state of the starting battery has the capacity, allowing the electric motor to be used for propelling the hybrid vehicle and warning a driver that the detected state of the starting battery does not have the capacity.

8. The command and control device as claimed in claim 7, further comprising a semi-automatic gearbox or automatic gearbox connected to the combustion engine, wherein the main electronic control unit allows the starting of the combustion engine followed by an engagement of the gearbox if it is detected that the state of the starting battery has the capacity when the vehicle is being propelled by the electric motor.

9. The device for starting a combustion engine as claimed in claim 7, wherein the starting battery is a 12 V (Volts) auxiliary battery.

10. The device allowing starting of a combustion engine as claimed in claim 7, further comprising an indicator means housed in the vehicle, connected to the main electronic control unit and alerting the driver to a mode of operation of the vehicle.

* * * * *